No. 858,217. PATENTED JUNE 25, 1907.
P. ROMMES.
COAL MINING DRILL POST.
APPLICATION FILED JULY 19, 1906.
2 SHEETS—SHEET 1.
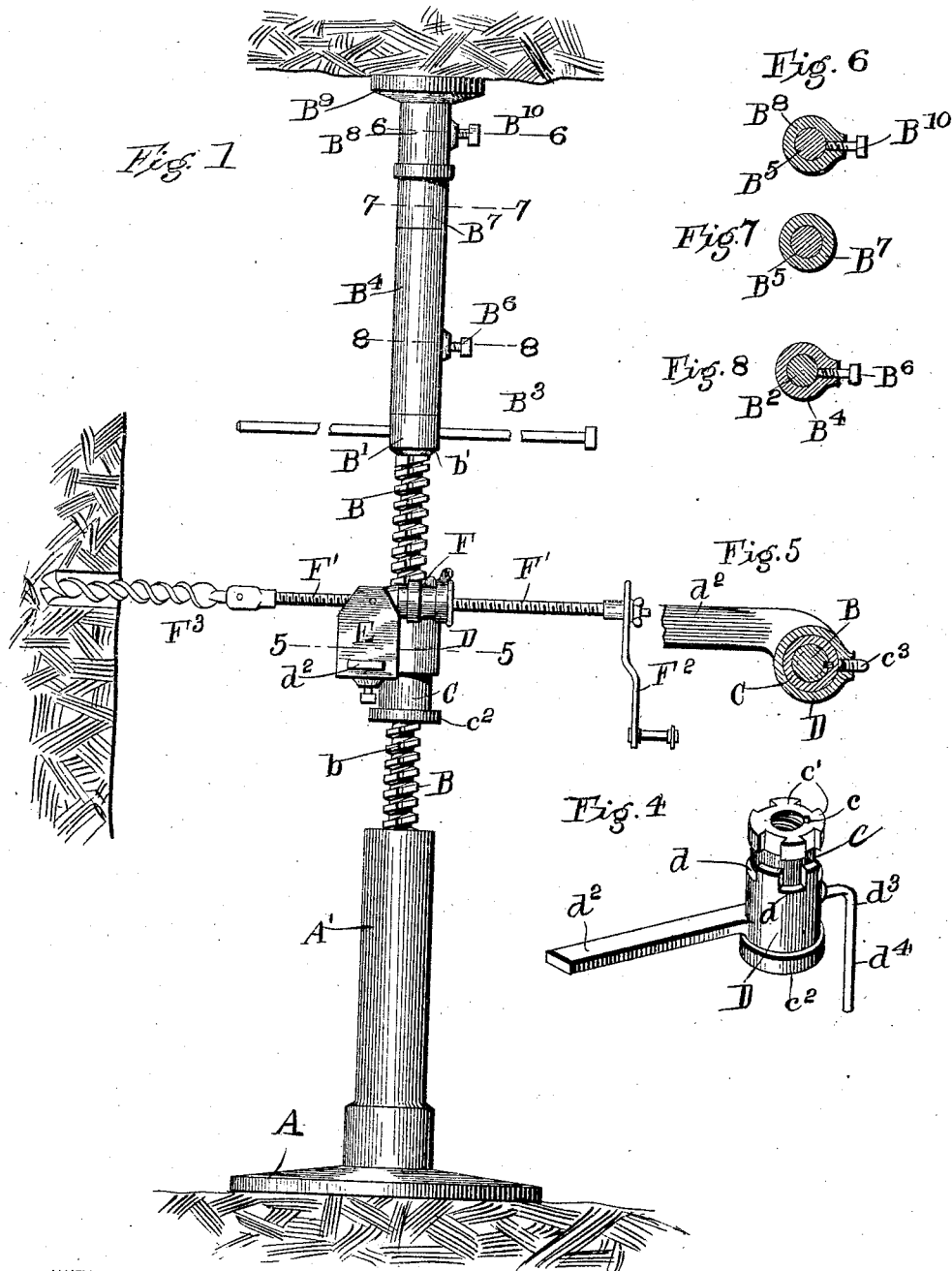
WITNESSES
INVENTOR
PAUL ROMMES
BY
ATTORNEYS

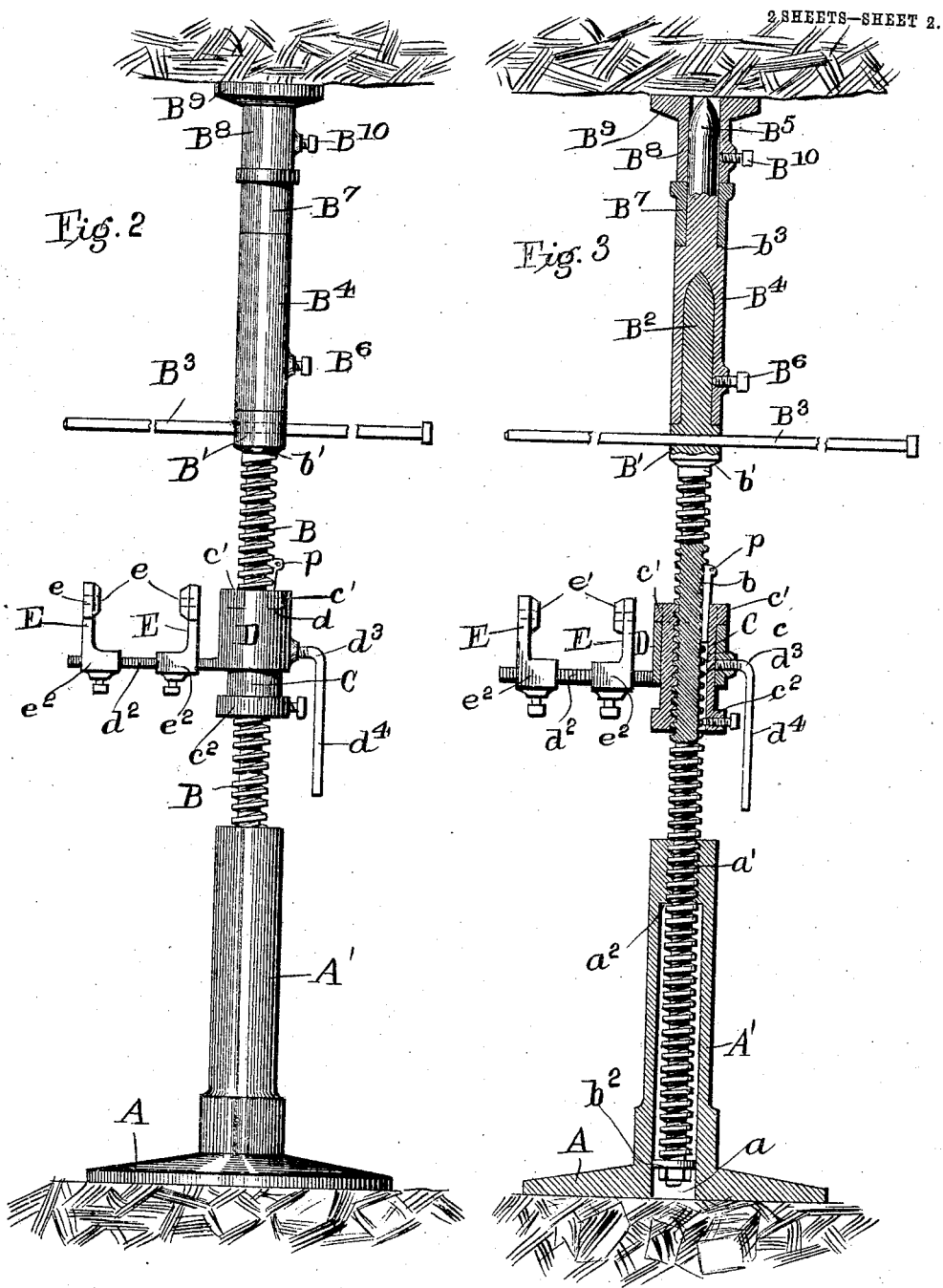

UNITED STATES PATENT OFFICE.

PAUL ROMMES, OF PITTSBURG, KANSAS.

COAL-MINING DRILL-POST.

No. 858,217.      Specification of Letters Patent.      Patented June 25, 1907.

Application filed July 19, 1906. Serial No. 326,846.

*To all whom it may concern:*

Be it known that I, PAUL ROMMES, a citizen of the United States, and a resident of Pittsburg, in the county of Crawford and State of Kansas, have made certain new and useful Improvements in Coal-Mining Drill-Posts, of which the following is a specification.

My invention relates to improvements in drill posts used in mining, and has for one of its objects to provide means for determining the course the drill will take before the post is firmly set and to save work and time; another object is to prevent the post from giving way when set on soft or infirm bottom; another object is to secure firmness and obviate wabbling motion when drill is being operated; another object is to afford facilities for the proper adjustment of threaded box; another object is to facilitate changing drills and removing borings from drill hole; another object is to afford means for attaching or connecting threaded boxings of various types and makes.

With these and other objects in view, my invention consists in certain novel features of construction, arrangement and combination of parts as will be hereinafter fully described and pointed out in the claims, reference being had to the accompanying drawing, in which Figure 1 is a side elevation of my device as in use. Fig. 2 is a front elevation. Fig. 3 is a sectional elevation of the complete device. Fig. 4 is a perspective view of the clutch or coupling member. Fig. 5 is a sectional plan view of the arm for supporting the thread box. Fig. 6 is a horizontal section on line 6—6 of Fig. 1. Fig. 7 is a similar section on line 7—7 of Fig. 1. Fig. 8 is a similar section on line 8—8 of Fig. 1.

The circular plate A, in the center of which and extending upwardly therefrom is a tube A', forms a foot and support for the device. The tube A' has extending from its lower end upwardly to near its upper end the unthreaded central passage $a$, while the upper passage $a'$ is somewhat reduced and threaded to receive the shaft B which is threaded and provided with a groove $b$ extending from its lower end to a shoulder $b'$ near its upper end. On the lower end of the shaft B which is reduced and threaded, is screwed a flanged nut $b^2$ which in being placed on said shaft is turned to the left. This nut is of greater diameter than the upper threaded passage in tube A', hence a shoulder $a^2$ will be formed against which nut $b^2$ may abut and thus prevent the shaft B from being withdrawn from the tube A', said shaft and tube A' forming what I term the post. The shaft B has near its upper end an enlargement B' forming the shoulder $b'$ before mentioned, and above this shoulder the smooth point $B^2$; through the shouldered portion is drilled a transverse hole to receive the turning rod $B^3$. In Figs. 1 and 3, I show what I term an "extension point" which consists of a cylindrical body $B^4$ and a smooth point $B^5$, said body having a socket to fit over the point $B^2$ and having a set screw $B^6$ passing through the side of same by means of which the ordinary point and the extension point may be locked together to retain adjustment. The extension point has a shoulder $b^3$ upon which rests a sleeve $B^7$ and upon this sleeve and surrounding the upper smooth end $B^5$ is the tubular cap $B^8$ which has the head $B^9$ which is flat and is to bear against the roof of the mine, as shown in Fig. 3, said cap being held immovable by the set screw $B^{10}$.

In Fig. 4 I have shown what I term a coupler or clutch which consists of an inner tube C provided with a threaded bore to screw on shaft B, said tube C having also an internal groove $c$ corresponding to the groove $b$ in shaft B to receive a pin $p$ to lock the two together and retain adjustment. The upper end of tube C is provided with lugs or teeth $c'$ which are intended to fit in notches $d$ in the upper edge of tubular sleeve D which together with the tube C forms the clutch or coupling. The sleeve D has projecting from one side, the rigid bar $d^2$ upon which are slidably mounted the two standards or brackets E provided with openings $e$ near their upper ends surrounded by the inwardly projecting annular flanges $e'$ to form bearing boxes for the trunnions of the thread box F which carries the threaded auger shaft F'. The lower ends of the standards E have the inwardly projecting feet $e^2$ which are slotted to fit on the bar $d^2$. The inner tube C of the coupling is provided with an annular rim $c^2$ at its lower end for preventing it being lifted out of sleeve D and is provided with a threaded hole to receive a set screw $c^3$ to adjust and lock the same to shaft B. The outer sleeve D is somewhat shorter than the inner tube C and is coupled to the inner tube by the lugs or teeth $c'$ fitting in the notches $d$. Said outer sleeve D is also provided with a threaded hole in which is fitted a set screw $d^3$ provided with the handle $d^4$ by means of which the tube C and sleeve D are immovably locked together. By removing the pin $p$ which couples the sleeve to the shaft B, and tightening the set screw $d^3$, the coupler or clutch member may be turned either way, thus raising or lowering the coupling on shaft B. The outer sleeve D may be turned independently of the inner tube C so that the arm $d^2$ can be adjusted at various horizontal angles, said adjustment being secured by means of the teeth, notches and set screw.

The threaded box F, threaded shaft F', crank $F^2$ and drill or auger $F^3$, are of ordinary construction, and form no part of my invention. The arm $d^2$ which supports the threaded box F and consequently the auger $F^3$ is placed or secured to the sleeve D in such a manner that when the device is set ready for work, that it (the arm $d^2$) is slightly in advance toward the coal, although it is obvious that I may use other arrangements of said arm. For some types of thread box, it will be of advantage to set the arm slightly to the rear. The standards E which support the thread box are of sufficient height, so that when the thread box is attached, it will swing clear of the arm, so that the drill may be pitched or elevated as desired. The object of having the flanges $e'$ surrounding the bearings in the upper ends of standards, is to provide means for using boxes provided with short trunnions.

The object of using the teeth $c'$ and the notches $d$ on the tube C and sleeve D, respectively, is to secure firmness and take strain off set screw when drill is being operated. In order to change drills and remove borings from drill hole, the set screw on coupling is loosed, thus permitting disengagement of the teeth, so that the arm may be swung around out of the way.

In case the roof of mine is uneven, making it difficult to set post, the cap $B^9$ may be removed from the upper end of post, or from upper end of extension $B^4$, when same is used, so that the upper end of post which is tapered to a point, may be forced into roof. The upper face of the cap $B^9$ should be serrated, milled or roughened in any suitable manner to insure firm hold.

The tube $B^7$ will be of advantage when it becomes necessary to set post, with cap removed, and the roof is of infirm nature, the end of post, which as hereinbefore stated, is tapered to a point, being forced up into roof a sufficient distance, the tube serving as a shoulder and will press against roof and prevent tapered point of post from penetrating farther.

In the drawing, I have shown only one hole through the shouldered portion of post to receive turning rod $B^3$, but I may use two or more holes crossing each other at angles to receive same. It is also obvious that I may use different types of set screw on the extension member $B^4$.

When the drill post is being set ready for work, and while turning threaded shaft to press cap $B^8$ against roof of mine, the set screw $B^{10}$ in cap may be tightened but not necessarily; the other set screw $B^6$ which is in body or near base of extension must be loose so as to let upper end $B^2$ of threaded shaft B rotate or turn in socket of extension.

When extension $B^4$ is not being used and sleeve $B^7$ and cap $B^8$ are placed on upper end of threaded shaft B, the set screw $B^{10}$ in cap must be loose to let smoother upper end of threaded shaft turn in said cap and sleeve. Set screws are tightened to retain adjustment when machine is not in use.

I claim:

1. In a coal drilling machine, a supporting post, means for anchoring the same at its upper and lower ends, an adjustable arm carried by said post, brackets slidably mounted on said arm, and a threaded box and auger shaft supported by said brackets.

2. In a coal drilling machine, a post having separable sections at its upper end means for anchoring the same at its upper and lower ends, an adjustable and rotatable arm carried by said post, brackets slidably mounted on said arm, and a threaded box and auger shaft supported by said brackets.

3. In a coal drilling machine, a post having separable and longitudinally extensible sections at its upper end, means for anchoring said post at its upper and lower ends, an adjustable and rotatable arm carried by said post, brackets slidably mounted on said arm, and a threaded box and auger shaft supported by said brackets.

4. In a coal drilling machine, a supporting post means for anchoring the same at its upper and lower ends, a separable coupling member carried by said post, an arm carried by said coupling member, brackets slidably mounted on said arm, and a threaded box and auger shaft supported by said brackets.

5. In a coal drilling machine, an internally threaded base member, a threaded shaft working in said base member and provided at its upper end with a tapered point, an adjustable and rotatable arm carried by said threaded shaft, brackets slidably mounted on said arm, and a threaded box and auger shaft supported by said brackets.

6. In a coal drilling machine a sectional post means for anchoring the same at its upper and lower ends, an adjustable and rotatable arm mounted on said post, brackets slidably mounted on said arm, and a threaded box and auger shaft supported by said brackets.

7. In a coal drilling machine, the combination with a base or standard, and a threaded post working therein, and having a tapered point at its upper end, of a coupling member, said coupling consisting of an inner threaded tube and an outer tubular sleeve surrounding the same, an arm carried by said outer tubular sleeve, brackets slidably mounted on said arm, and means for locking the inner threaded tube and the outer sleeve together.

8. In a coal drilling machine, the combination with a standard and base and a threaded post working therein, and having a tapered point at its upper end, of a coupling member consisting of an internally threaded tube engaging the threaded post, said tube having an annular rim at its lower end and teeth or lugs at its upper end, a sleeve surrounding said internally threaded tube, and adapted to rotate and slide vertically thereon and having notches in its upper edge to fit the lugs or teeth at the upper end of the tube, an arm projecting to one side and forwardly from said sleeve, brackets slidably mounted on said arm, and means for rigidly locking the member of the coupling to each other and to the threaded post.

9. In a coal drilling machine, a post comprising a base standard internally threaded, a threaded shaft working therein, and provided at its upper end with a reduced tapered point, an extension having a socket therein to fit said tapered point and provided at its upper end with a tapered point, and a tubular cap adapted to fit over said extension point, and having an annular flange forming a head for the same.

10. In a coal drilling machine, the combination with a standard and base and a threaded post working therein, having a longitudinal groove and pointed upper end, a coupling member adapted to work on said threaded shaft, said coupling member consisting of an inner internally threaded tube provided with an internal longitudinal groove, and having at its upper end a series of lugs and at its lower end an annular rim, and an outer sleeve fitting on said inner tube, said outer sleeve having notches in its upper edge to engage the lugs of the inner tube and an arm projecting to one side and forwardly from said outer sleeve, a locking pin adapted to fit in the grooves of the threaded shaft and inner threaded tube when in register, and means for rigidly locking the inner tube and outer sleeve together against longitudinal movement.

11. In a coal drilling machine, a supporting post means for anchoring the same at its upper and lower ends, an adjustable and rotatable arm carried by said post, brackets slidably mounted on said arm, and a drill supported by said brackets.

12. In a coal mining machine, a separable post means for anchoring the same at its upper and lower ends, an adjustable and rotatable arm carried by said post, brackets slidably mounted on said arm and a drill supported by said brackets.

13. In a coal drilling machine, a separable and longitudinally extensible supporting post means for anchoring the same at its upper and lower ends, an adjustable and rotatable arm carried by said post, brackets slidably mounted on said arm, and a drill supported by said brackets.

14. In a coal drilling machine, a longitudinally extensible supporting post means for anchoring the same at its upper and lower ends, an adjustable and rotatable arm carried by said post, brackets slidably mounted on said arm, and a threaded box and auger shaft supported by said brackets.

PAUL ROMMES.

Witnesses:
J. B. DANA,
C. N. RALEY.